(12) United States Patent
Bortz et al.

(10) Patent No.: US 8,161,529 B1
(45) Date of Patent: Apr. 17, 2012

(54) HIGH-ASSURANCE ARCHITECTURE FOR ROUTING OF INFORMATION BETWEEN NETWORKS OF DIFFERING SECURITY LEVEL

(75) Inventors: Mark A. Bortz, Robins, IA (US); Matthew M. Wilding, Cedar Rapids, IA (US); James A. Marek, Anamosa, IA (US); David S. Hardin, Cedar Rapids, IA (US); T. Douglas Hiratzka, Coralville, IA (US); Philippe M. T. Limondin, Cedar Rapids, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 1097 days.

(21) Appl. No.: 11/820,351

(22) Filed: Jun. 19, 2007

Related U.S. Application Data (63) Continuation-in-part of application No. 11/366,136, filed on Mar. 2, 2006, now Pat. No. 7,606,254.

(51) Int. Cl.
*H04L 29/06* (2006.01)
(52) U.S. Cl. ........... 726/3; 726/27; 713/166; 709/223
(58) Field of Classification Search ............. 726/1–7, 726/11–14, 16–21, 26–30; 713/150, 164, 713/166; 709/223–226
See application file for complete search history.

(56) References Cited

U.S. PATENT DOCUMENTS

| | | | | |
|---|---|---|---|---|
| 5,164,988 A | * | 11/1992 | Matyas et al. | 713/156 |
| 2004/0025016 A1 | * | 2/2004 | Focke et al. | 713/164 |
| 2004/0210663 A1 | * | 10/2004 | Phillips et al. | 709/230 |
| 2004/0250059 A1 | * | 12/2004 | Ramelson et al. | 713/150 |
| 2005/0027793 A1 | * | 2/2005 | Hass | 709/200 |
| 2005/0097300 A1 | * | 5/2005 | Gildea et al. | 712/11 |
| 2005/0097357 A1 | * | 5/2005 | Smith | 713/201 |
| 2007/0291791 A1 | * | 12/2007 | English et al. | 370/469 |

OTHER PUBLICATIONS

Nancy Welsh, Rockwell Collins Receives MILS Certification from NSA on Microprocessor, Aug. 24, 2005, website http://www.rotor.com/Publications/RotorNewssupregsupArchives/tabid/75/mid/397/newsid397/58565/Default.aspx.*

* cited by examiner

*Primary Examiner* — Edward Zee
*Assistant Examiner* — John B King
(74) *Attorney, Agent, or Firm* — Donna P. Suchy; Daniel M. Barbieri (57) ABSTRACT

The present invention is directed to routing information between networks of differing security level. Communication to/from each network is handled by a dedicated Offload Engine (OE). Each OE interfaces to a Guard Engine through a Guard Data Mover (GDM) and includes an interface for connecting to an external network. A first OE receives a data packet from a first network intended to be transmitted to a second network. The Guard Engine analyzes the data packet. The Guard Engine includes an ACL (Access Control List) which are rules data packets must meet before being passed onto a destination network. If allowed, the Guard Engine delivers the data packet to the second network via a second OE utilizing a GDM associated with the first OE and a GDM associated with the second OE. The architecture of the present invention reduces the time and effort needed to attain high-assurance certification.

24 Claims, 6 Drawing Sheets

HIGH-ASSURANCE ARCHITECTURE FOR ROUTING OF INFORMATION BETWEEN NETWORKS OF DIFFERING SECURITY LEVEL

CROSS-REFERENCE TO RELATED APPLICATIONS

The present application is a continuation-in-part application and claims priority under 35 U.S.C. §120 to the U.S. patent application Ser. No. 11/366,136 entitled: Evaluatable High-Assurance Guard for Security Applications filed Mar. 2, 2006 now U.S. Pat. No. 7,606,254, which is herein incorporated by reference in its entirety.

FIELD OF THE INVENTION

The present invention relates to the field of computing systems and particularly to routing of information between networks of differing security level.

BACKGROUND OF THE INVENTION

In highly secure computer systems, there is often a need to share information between networks with differing security level. For example, an unclassified network may need to share information with a top-secret network. High-assurance guards are utilized in highly secure computer systems to interconnect networks of differing security level.

However, in order to receive the desired "high-assurance" or "trusted" certification from government organizations such as the National Computer Security Center (NCSC), such guards must be subjected to an evaluation program (such as the Trusted Products Evaluation Program (TPEP)) in which they are tested against a comprehensive set of security-related criteria. Guards that interconnect unclassified and top secret networks need to be accredited to protection level 5 (PL5). Further, such evaluation typically requires construction and solution of complex mathematical proofs designed to prove the "correctness" of the guard being evaluated. Unfortunately, constructing and solving such proofs can make the evaluation process a complex, time-consuming and expensive undertaking.

Therefore, it may be desirable to provide high-assurance routing of information between networks of differing security level which addresses the above-referenced problems and limitations of the current solutions.

SUMMARY OF THE INVENTION

Accordingly, the present invention is directed to high-assurance routing of information between networks of differing security level. The present invention enforces a security policy on a data flow. Communication to and from each network is handled by a dedicated Offload Engine (OE). Each Offload Engine includes an interface for connecting to an external network. Each OE interfaces to a Guard Engine through a Guard Data Mover (GDM). A first OE receives a data packet from a first network intended to be transmitted to a second network. The Guard Engine analyzes the data packet. The Guard Engine may include an ACL (access control list) which are rules data packets must meet before being passed onto a destination network. If allowed by the ACL, the Guard Engine delivers the data packet to the second network via a second OE utilizing a GDM associated with the first OE and a GDM associated with the second OE.

Each OE may include an operating system (including, but not limited to, Linux, Unix, Windows, and Mac OS) which includes drivers for the GDM and a watchdog unit hosted on an embedded processor including, but not limited to, an ARM processor (a 32-bit RISC (reduced instruction set computer) processor developed by ARM Limited and utilized in a number of embedded designs). A TCP/IP stack is provided with an interface to an Ethernet MAC (media access control) device. The Guard Engine may be based on the AAMP7 (Advanced Architecture MicroProcessor 7) microprocessor (a microprocessor with an intrinsic partitioning architecture developed by Rockwell Collins and designed for use in embedded systems). The GDM comprises a FPGA (field programmable gate array) based engine that provides independent data channels that allow the Guard Engine and OEs to communicate in a high-assurance manner.

During previous high-assurance certification evaluations, intrinsic partitioning mechanisms have been mathematically proven correct. This reduces the amount of software which needs to be evaluated to a high Evaluation Assurance Level (EAL). Further, the very nature of the intrinsic partitioning architecture allows the amount of critical code to be small, since it is unburdened by complex interprocess communications software that may be found in operating systems for general-purpose microprocessors. Proofs of correctness may proceed from a symbolic simulation of critical code of the present invention utilizing a formal model. An automated theorem prover, such as an ACL2 (A Computational Logic for Applicative Common LISP (List Processing)), may then be utilized to perform detailed proof steps for establishing correctness. Each of the above-referenced factors may promote ease of evaluation when trying to attain high-assurance certification of the present invention by reducing the time and effort needed for evaluation.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
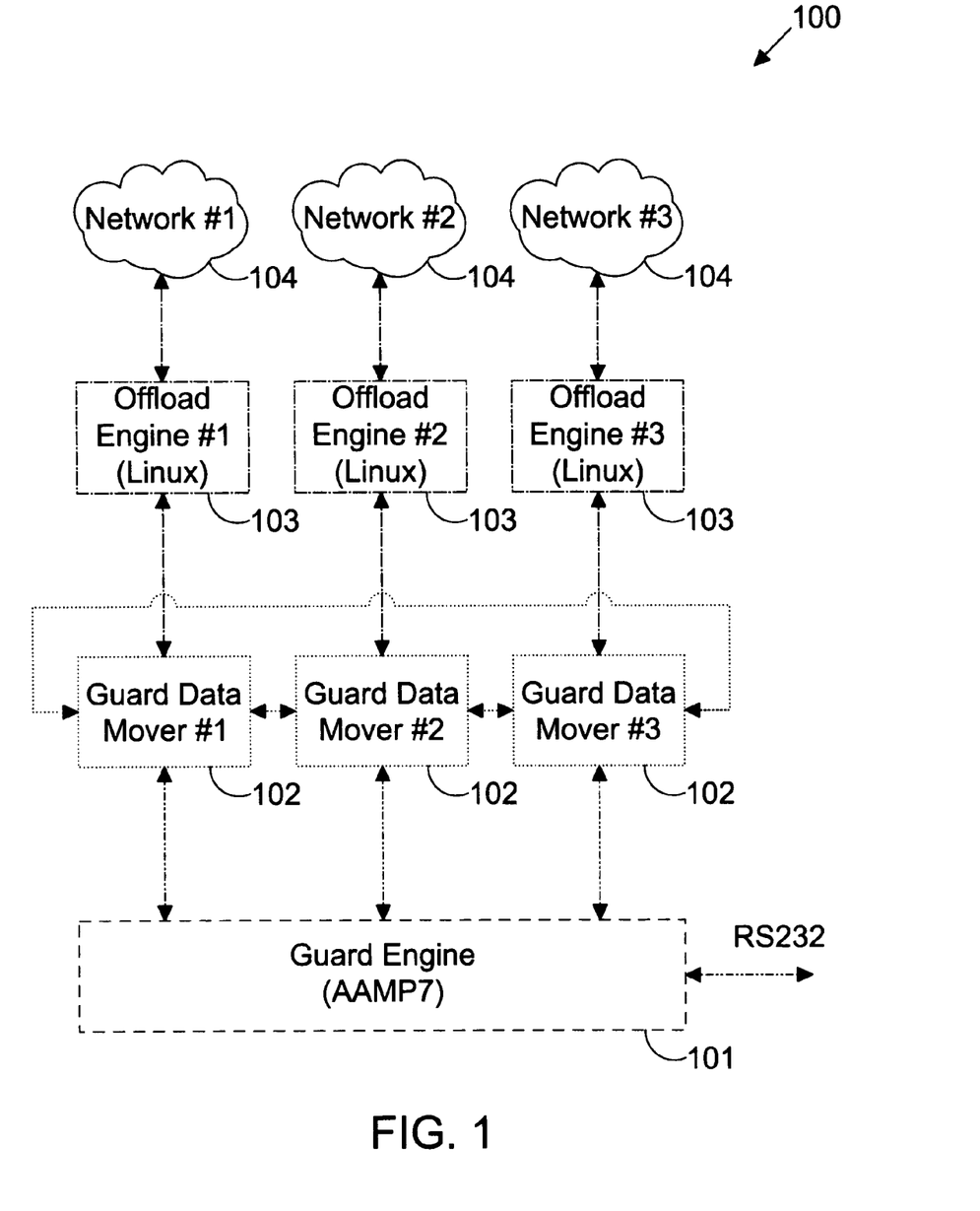
FIG. 1 is a block diagram of a device for routing information between networks of differing security level, in accordance with an exemplary embodiment of the present invention.

FIG. 1 illustrates a block diagram of a device 100 for routing information between networks of differing security level, in accordance with an exemplary embodiment of the present invention. The device 100 enforces a security policy on a data flow. As shown, the device 100 is capable of connecting to three different networks 104. However, the device 100 may be capable of connecting to different numbers of different networks 104 without departing from the scope of the present invention. Communication to and from each network 104 is handled by a dedicated Offload Engine (OE) 103. Each Offload Engine 103 includes an interface for connecting to an external network 104. The interface may include, but is not limited to a 10/100 Ethernet interface and a RS232 interface. Each OE 103 interfaces to a Guard Engine 101 through a Guard Data Mover (GDM) 102.

A first OE 103 receives a data packet from a first network 104 intended to be transmitted to a second network 104. The data packet may be intended to be transmitted to a second network 104 if a header of the data packet specifies the second network 104 as a destination for the data packet. The Guard Engine 101 analyzes the data packet. The Guard Engine 101 may include an ACL (access control list) which are rules data packets must meet before being passed onto a destination network. If allowed by the ACL, the Guard Engine 101 delivers the data packet to the second network 104 via a second OE 103 utilizing a GDM 102 associated with the first OE 103 and a GDM associated with the second OE 103. The Guard Engine 101 may generate an audit record. The audit record may include, but is not limited to, health status of the OEs 103 and the Guard Engine 101 and failed data packet transmission attempts. The Guard Engine 101 may deliver the audit record to the first network 104 via the first GDM 102 and the first OE 103, the second network 104 via the second GDM 102 and the second OE 103, or a third network 104 (which may be an audit network) via a third GDM 102 and a third OE 103.

A data packet may be defined as a fundamental unit of information carriage in all modern computer networks that implement packet switching. For instance, the data packet may include a header, which contains information that may be used to forward the data packet from its source to its destination. Further, the data packet may include a data area which contains information about a user who caused the creation of the data packet. Additionally, the data packet may include a trailer which may contain techniques for ensuring that errors do not occur during data transmission.

Figure 2:
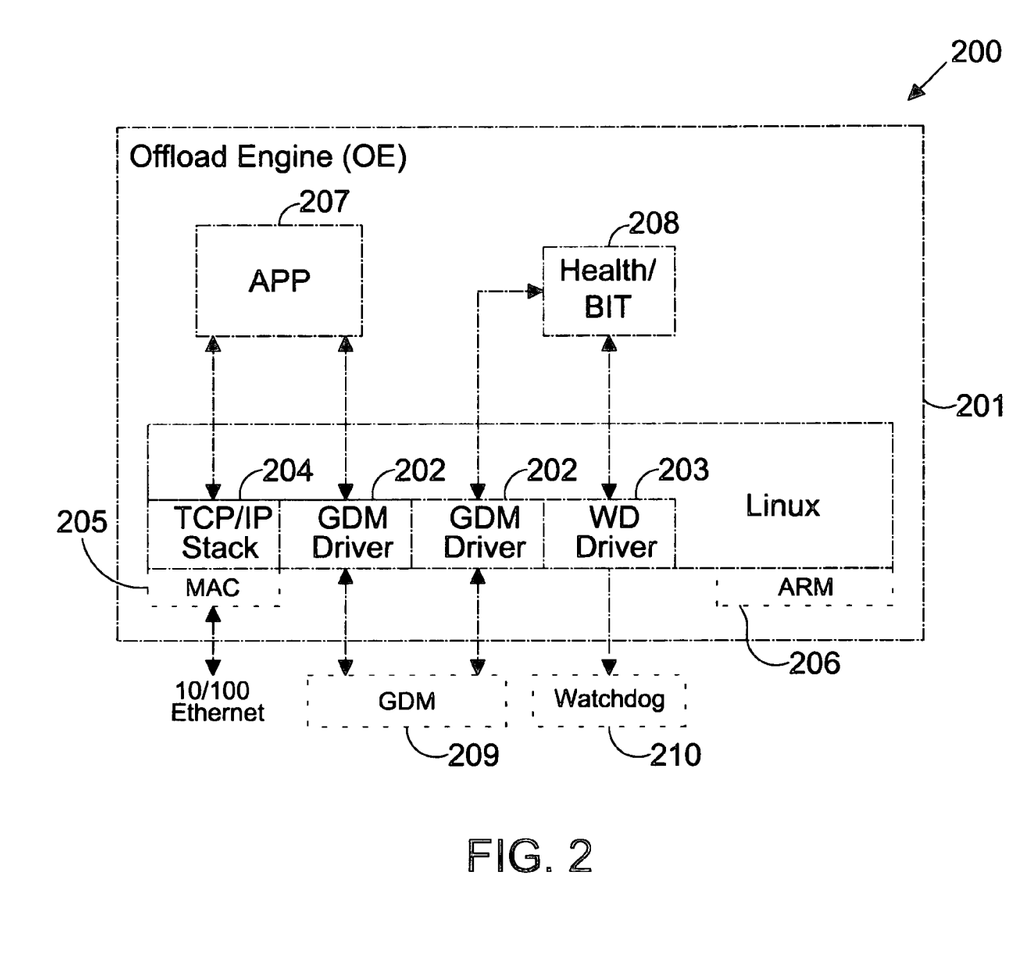
FIG. 2 is a block diagram of an Offload Engine, in accordance with an exemplary embodiment of the present invention.

Referring to FIG. 2, each OE 200 may consist of a Linux operating system 201 which includes drivers 202 and 203 for the GDM 209 and a watchdog unit 210. A TCP/IP stack 204 may be provided with an interface to a 10/100 Mbit Ethernet MAC (media access control) device 205. The OE software may be hosted on an ARM processor (a 32-bit RISC (reduced instruction set computer) processor utilized in a number of embedded designs) 206. Executing on the Linux operating system may be both the system integrator supplied applications 207 and a health monitoring and Built In Test (BIT) application 208. The system integrator applications 207 and any data associated with them are referred to as "configuration data."

Figure 3:
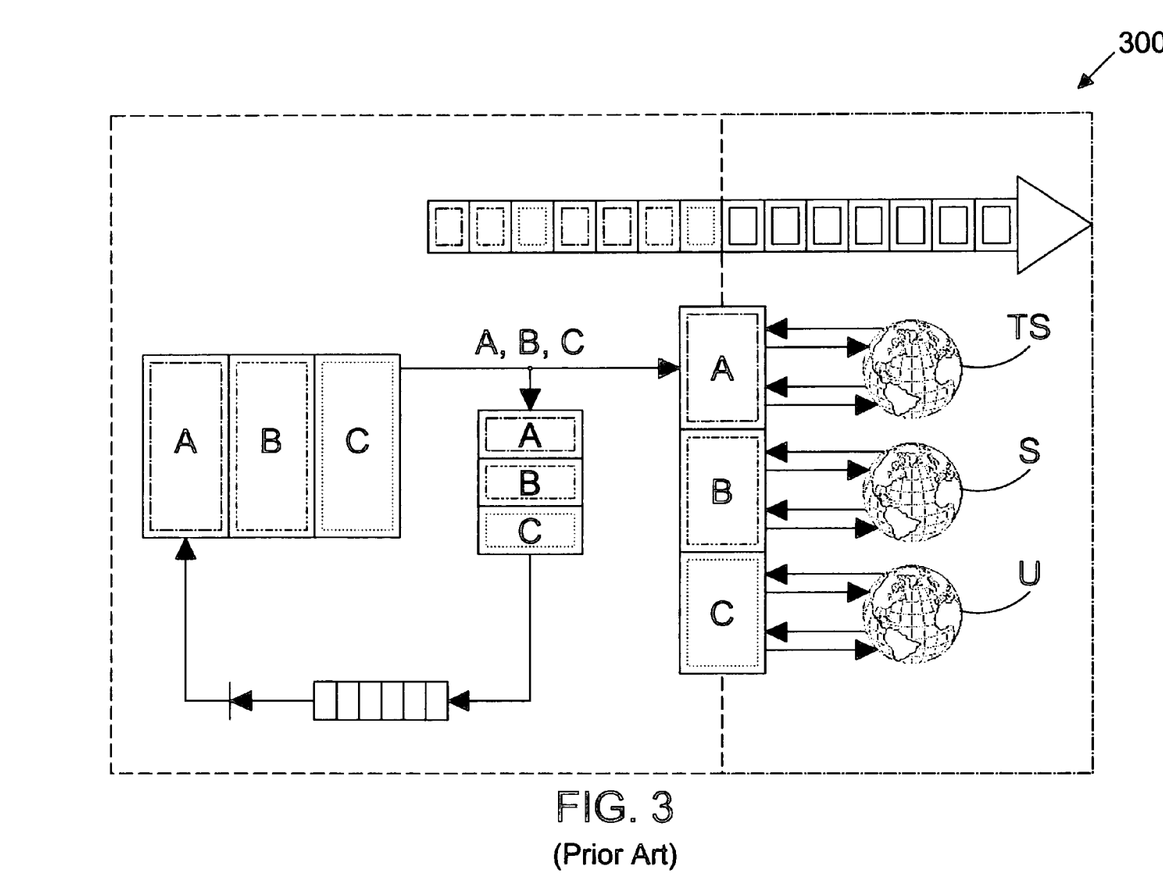
FIG. 3 is a block diagram illustrating the intrinsic partitioning of the AAMP7 microprocessor, as is known in the art.

The Guard Engine 101 may be based on the AAMP7 (Advanced Architecture MicroProcessor 7) microprocessor (a microprocessor with an intrinsic partitioning architecture designed for use in embedded systems). The intrinsic partitioning, the NSA (National Security Agency) MILS (Multiple Independent Levels of Security) certification of the AAMP7G (Advanced Architecture MicroProcessor 7 Government Version), and formally analyzed software provide a high-assurance compute core for the enforcement of a security policy. Intrinsic partitioning is an architectural feature of the AAMP7 which allows the integration of multiple applications in a way that allows for their assured separation. Partitions are processing contexts where communication between partitions is limited to what is allowed by an information flow policy. A partitioned system is capable of supporting MILS which is necessary for integration of multiple secured applications into a single embedded system. The intrinsic partitioning mechanism operates as a separation kernel implemented in microcode. Referring to FIG. 3, rather than managing operating system tasks, however, the intrinsic partitioning mechanism maintains appropriate separation between a set of system partitions implemented directly in the microarchitecture and associated microcode. The AAMP7 is designed to enforce a communication policy between partitions that ensures that improper communication is not allowed, thereby providing a system designer a useful and dependable building block for designing and implementing secure systems.

A system has intrinsic partitioning if it is designed from the ground up to enforce this kind of brick wall separation. Intrinsic partitioning, such as that natively supported by the AAMP7 microprocessor, provides absolute assurance of the spatial and temporal separation between partitions. The underlying processing platform enforces a policy of information flow between partitions with mechanisms that are designed into the machine itself, not added later at the operating system or application levels. This approach results in a simpler separation mechanism, reflecting the fact that the myriad implementation details that need to be verified to ensure security of the system are typically low-level considerations. These considerations, including whether all user instructions adhere to memory protection policies, whether a user partition can deny processing to other partitions, whether caches are shared between partitions, and other low-level details that are crucial for security. To ensure that highly sensitive data can be securely mixed with data and programs at lower or unclassified levels requires a separation mechanism that is best implemented and certified at a low level of the design.

Figure 4:
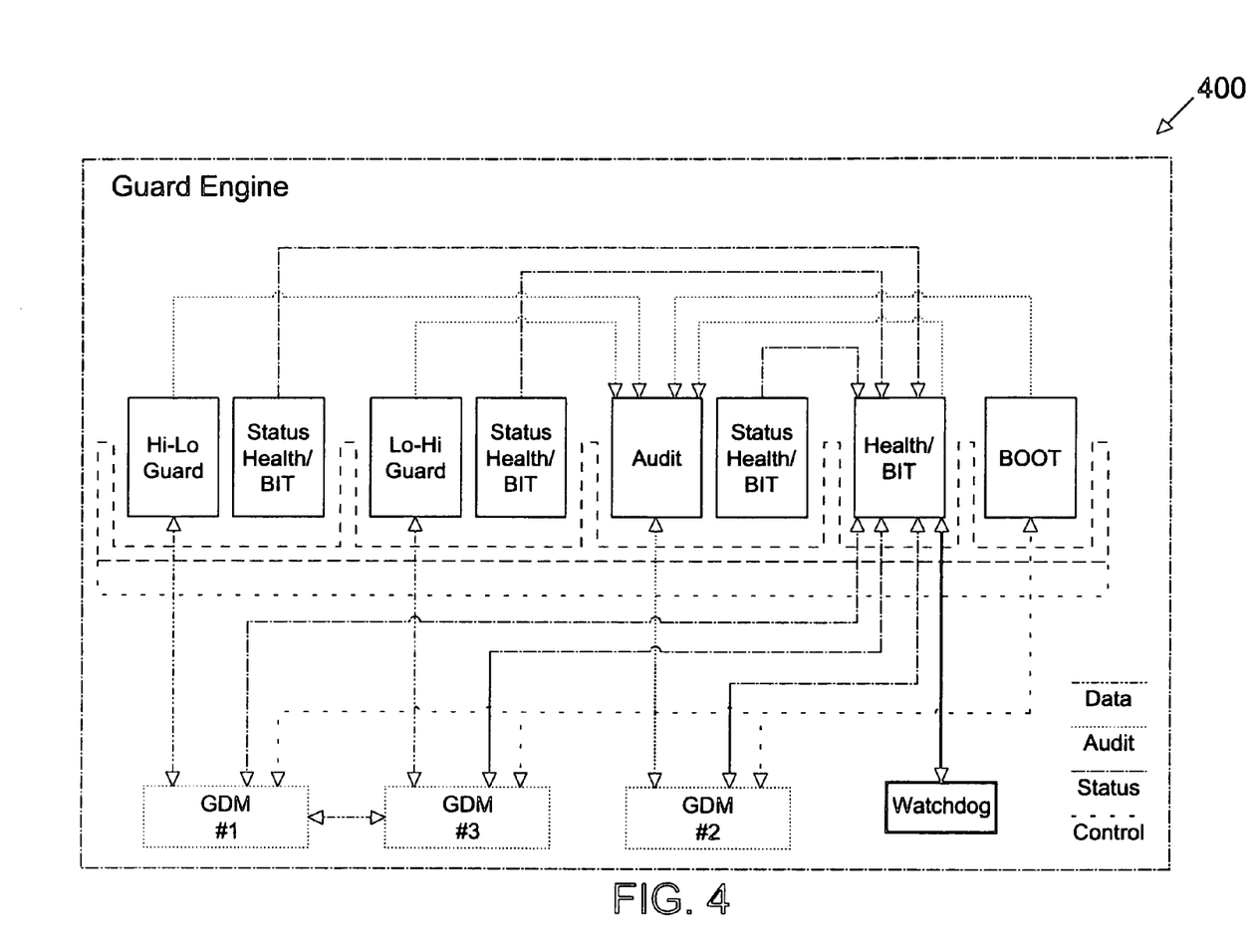
FIG. 4 is a block diagram illustrating the interaction between the Guard Engine hardware and software, in accordance with an exemplary embodiment of the present invention.

Referring to FIG. 4, the interaction 400 between the Guard Engine 101 hardware and software is illustrated. As illustrated, the Guard Engine 101 interacts with three GDMs. However, the Guard Engine 101 may be capable of interacting with different numbers of GDMs without departing from the scope of the present invention. The present invention may rely on intrinsic partitioning to enforce which applications are allowed to configure hardware, review messages and approve their transmission through the guard, and finally to manage health and audit functions. The separation provided by intrinsic partitioning may help simplify analysis of the various functions of the present invention.

Figure 5:
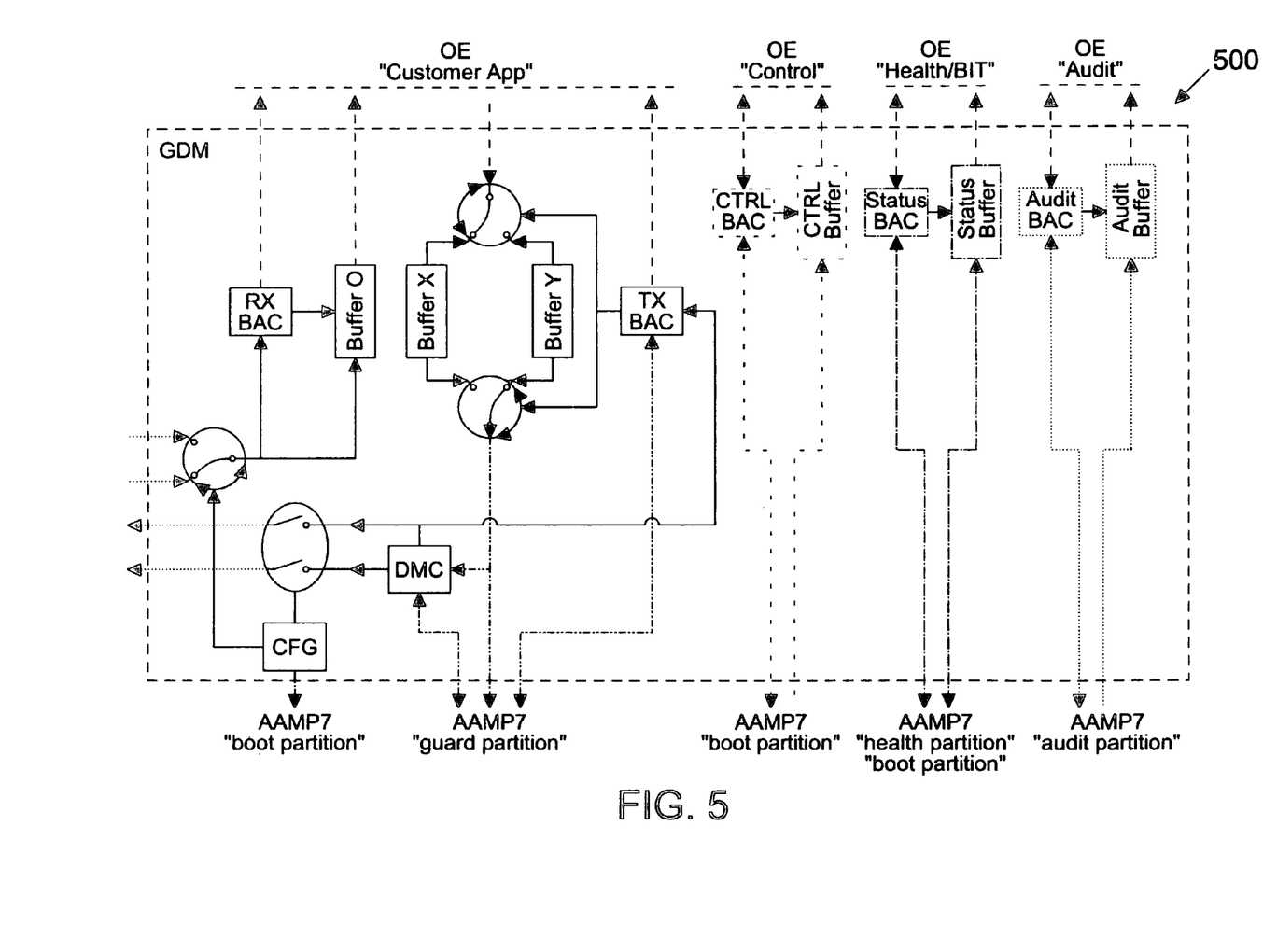
FIG. 5 is a block diagram illustrating the high-level interaction between the Guard Engine software, the Offload Engine software, and the Guard Data Mover, in accordance with an exemplary embodiment of the present invention.

The GDM 102 may comprise a FPGA (field programmable gate array) based engine that provides independent data channels that allow the Guard Engine 101 and OEs 103 to communicate in a high-assurance manner. The GDM 102 may include four main functions/data paths. However, the GDM 102 may include different numbers of functions/data paths without departing from the scope of the present invention. The first may act as an accelerator to move data between networks of differing levels of security under direction of the Guard Engine 101. This may provide a significant performance boost by alleviating the need for the Guard Engine 101 to move every byte of a data message to the intended OE 103. The GDM 102 does not make any independent decisions to move data. Rather, the GDM 102 relies on the Guard Engine 101 to analyze the message and initiate the transfer. The second function may provide a separate data path for the OEs 103 to pass health & BIT status messages to the Guard Engine 101. This data path may be unidirectional so that data can only flow into the Guard Engine 101. The third function may provide a data path for the Guard Engine to pass control messages to the OE 103. This data path may be unidirectional so that control can only flow from the Guard Engine 101 to the OE 103. The fourth function may provide an interface for the Guard Engine 101 to pass audit messages to the OE 103. Audit data may be defined as system-generated data which corresponds directly to recorded actions taken by identifiable and authenticated users. This interface may be unidirectional so that the audit messages can flow only from the Guard Engine 101 to the OE 103. FIG. 5 illustrates the high-level interaction 500 between the Guard Engine 101 software, OE 103 software, and the GDM 102.

Figure 6:
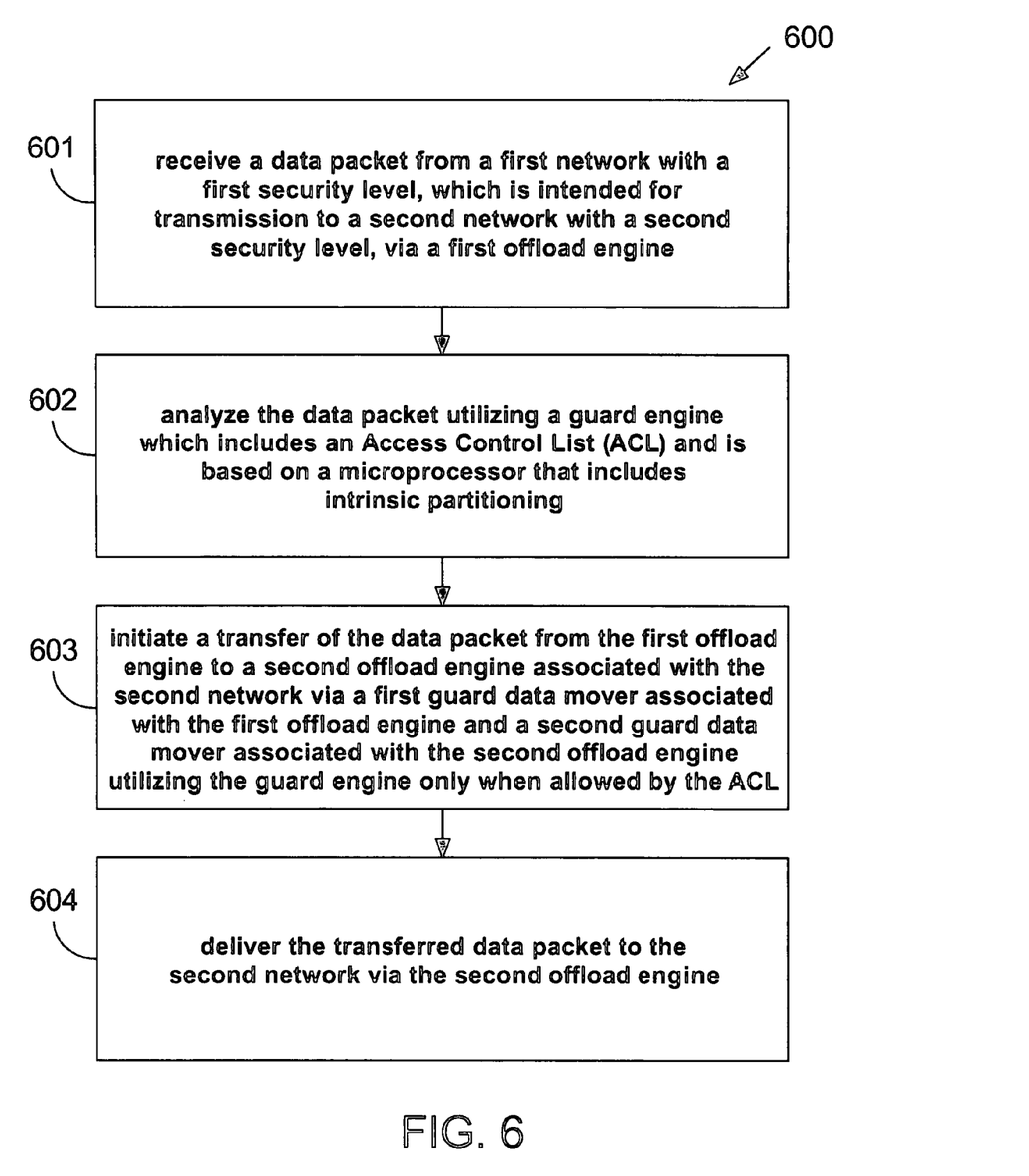
FIG. 6 is a flow chart illustrating a method for routing information between networks of differing security level, in accordance with an exemplary embodiment of the present invention.

FIG. 6 is a flow chart illustrating a method 600 for routing of information between networks of differing security level, in accordance with an exemplary embodiment of the present invention. In step 601, a data packet is received from a first network with a first security level, which is intended for transmission to a second network with a second security level, via a first offload engine. In step 602, the data packet is analyzed utilizing a guard engine which includes an ACL and is based on a microprocessor that includes intrinsic partitioning. In step 603, a transfer of the data packet from the first offload engine to a second offload engine associated with the second network via a first guard data mover associated with the first offload engine and a second guard data mover associated with the second offload engine is initiated utilizing the guard engine only when allowed by the ACL. In step 604, the transferred data packet is delivered to the second network via the second offload engine.

During previous high-assurance certification evaluations, intrinsic partitioning mechanisms have been mathematically proven correct. This reduces the amount of software which needs to be evaluated to a high Evaluation Assurance Level (EAL). Further, the very nature of the intrinsic partitioning architecture allows the amount of critical code to be small, since it is unburdened by complex interprocess communications software that may be found in operating systems for general-purpose microprocessors. Proofs of correctness may proceed from a symbolic simulation of critical code of the present invention utilizing a formal model. An automated theorem prover, such as an ACL2 (A Computational Logic for Applicative Common LISP (List Processing)), may then be utilized to perform detailed proof steps for establishing correctness. Each of the above-referenced factors may promote ease of evaluation when trying to attain high-assurance certification of the present invention by reducing the time and effort needed for evaluation.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for routing of information between networks of differing security level, comprising:
    receiving a data packet from a first network with a first security level, the data packet intended for transmission to a second network with a second security level, via a first offload engine;
    analyzing the data packet utilizing a guard engine which includes an access control list (ACL) and is based on a microprocessor that includes intrinsic partitioning;
    initiating a transfer of the data packet from the first offload engine to a second offload engine associated with the second network via a first guard data mover associated with the first offload engine and a second guard data mover associated with the second offload engine utilizing the guard engine only when allowed by the ACL, where the first guard data mover provides a first independent unidirectional data channel between the first offload engine and the guard engine for health and status messages from the first offload engine to the guard engine, and where the first guard data mover provides a second independent unidirectional data channel between the guard engine and the first offload engine for control messages from the guard engine to the first offload engine; and
    delivering the transferred data packet to the second network via the second offload engine.

2. The method as claimed in claim 1, wherein the guard engine is based on a AAMP7 (Advanced Architecture Microprocessor 7) microprocessor.

3. The method as claimed in claim 1, wherein the second guard data mover includes a plurality of independent data channels which allow communication between the guard engine and the second offload engine.

4. The method as claimed in claim 1, further comprising the steps of:
gathering an audit record utilizing the guard engine; and
delivering the audit record utilizing the guard engine to one selected from the first network via the first guard data mover and the first offload engine, the second network via the second guard data mover and the second offload engine, and a third network via a third guard data mover and a third offload engine.

5. The method as claimed in claim 1, wherein the first guard data mover comprises a FPGA (field programmable gate array) based engine and the second guard data mover comprises a FPGA based engine.

6. The method as claimed in claim 1, wherein the data packet is intended for transmission to the second network when a header of the data packet specifies the second network as the destination of the data packet.

7. A non-transitory computer-readable medium having computer-executable instructions for performing a method for routing of information between networks of differing security level, said method comprising:
receiving a data packet from a first network with a first security level, which is intended for transmission to a second network with a second security level, via a first offload engine;
analyzing the data packet utilizing a guard engine which includes an access control list (ACL) and is based on a microprocessor that includes intrinsic partitioning;
initiating a transfer of the data packet from the first offload engine to a second offload engine associated with the second network via a first guard data mover associated with the first offload engine and a second guard data mover associated with the second offload engine utilizing the guard engine only when allowed by the ACL, where the first guard data mover provides a first independent unidirectional data channel between the first offload engine and the guard engine for health and status messages from the first offload engine to the guard engine, and where the first guard data mover provides a second independent unidirectional data channel between the guard engine and the first offload engine for control messages from the guard engine to the first offload engine; and
delivering the transferred data packet to the second network via the second offload engine.

8. The non-transitory computer-readable medium having computer-executable instructions for performing a method for routing of information between networks of differing security level as claimed in claim 7, wherein the guard engine is based on a AAMP7 (Advanced Architecture MicroProcessor 7) microprocessor.

9. The non-transitory computer-readable medium having computer-executable instructions for performing a method for routing of information between networks of differing security level as claimed in claim 7, wherein the second guard data mover includes a plurality of independent data channels which allow communication between the guard engine and the second offload engine.

10. The non-transitory computer-readable medium having computer-executable instructions for performing a method for routing of information between networks of differing security level as claimed in claim 7, further comprising the steps of:
gathering an audit record utilizing the guard engine; and
delivering the audit record utilizing the guard engine to one selected from the first network via the first guard data mover and the first offload engine, the second network via the second guard data mover and the second offload engine, and a third network via a third guard data mover and a third offload engine.

11. The non-transitory computer-readable medium having computer-executable instructions for performing a method for routing of information between networks of differing security level as claimed in claim 7, wherein the first guard data mover comprises a FPGA (field programmable gate array) based engine and the second guard data mover comprises a FPGA based engine.

12. The non-transitory computer-readable medium having computer-executable instructions for performing a method for routing of information between networks of differing security level as claimed in claim 7, wherein the data packet is intended for transmission to the second network when a header of the data packet specifies the second network as the destination of the data packet.

13. A system for routing of information between networks of differing security level, comprising:
a first network with a first security level;
a second network with a second security level;
a first offload engine connected to the first network;
a second offload engine connected to the second network;
a first guard data mover associated with the first offload engine;
a second guard data mover associated with the second offload engine; and
a guard engine which includes an access control list (ACL) and is based on a microprocessor that includes intrinsic partitioning,
wherein the guard engine is operable to analyze a data packet received by the first offload engine from the first network and intended for transmission to the second network and the guard engine is operable to utilize the first guard data mover and the second guard data mover to transfer the data packet from the first offload engine to the second network via the second offload engine only when allowed by the ACL, where the first guard data mover provides a first independent unidirectional data channel between the first offload engine and the guard engine for health and status messages from the first offload engine to the guard engine, and where the first guard data mover provides a second independent unidirectional data channel between the guard engine and the first offload engine for control messages from the guard engine to the first offload engine.

14. The system as claimed in claim 13, wherein the guard engine is based on a AAMP7 (Advanced Architecture Micro-Processor 7) microprocessor.

15. The system as claimed in claim 13, wherein the second guard data mover includes a plurality of independent data channels which allow communication between the guard engine and the second offload engine.

16. The system as claimed in claim 13, wherein the guard engine gathers an audit record and delivers the audit record to one selected from the first network utilizing the first guard data mover and the first offload engine, the second network utilizing the second guard data mover and the second offload engine, and a third network utilizing a third guard data mover connected to the guard engine and a third offload engine connected to the third guard data mover and the third network.

17. The system as claimed in claim 13, wherein the first guard data mover comprises FPGA (field programmable gate array) based engine and the second guard data mover comprises a FPGA based engine.

18. The system as claimed in claim 13, wherein the data packet is intended for transmission to the second network when a header of the data packet specifies the second network as the destination of the data packet.

19. A device for routing of information between networks of differing security level, comprising:
- a first offload engine including an interface for connecting to a first network with a first security level;
- a second offload engine including an interface for connecting to a second network with a second security level;
- a first guard data mover operatively coupled to the first offload engine;
- a second guard data mover operatively coupled to the second offload engine and the first guard data mover; and
- a guard engine operatively coupled to the first guard data mover and the second guard data mover which includes an access control list (ACL) and is based on a microprocessor that includes intrinsic partitioning, wherein the guard engine is operable to analyze a data packet received by the first offload engine from the first network and intended for transmission to the second network and the guard engine is operable to utilize the first guard data mover and the second guard data mover to transfer the data packet from the first offload engine to the second network via the second offload engine only when allowed by the ACL, where the first guard data mover provides a first independent unidirectional data channel between the first offload engine and the guard engine for health and status messages from the first offload engine to the guard engine, and where the first guard data mover provides a second independent unidirectional data channel between the guard engine and the first offload engine for control messages from the guard engine to the first offload engine.

20. The device of claim 19, wherein the guard engine is based on a AAMP7 (Advanced Architecture MicroProcessor 7) microprocessor.

21. The device of claim 19, wherein the second guard data mover includes a plurality of independent data channels which allow communication between the guard engine and the second offload engine.

22. The device of claim 19, wherein the guard engine gathers an audit record and delivers the audit record to one selected from the first network utilizing the first guard data mover and the first offload engine, the second network utilizing the second guard data mover and the second offload engine, and a third network utilizing a third guard data mover operatively coupled to the guard engine and a third offload engine including an interface for connecting to the third network operatively coupled to the third guard data mover.

23. The device of claim 19, wherein the first guard data mover comprises a FPGA (field programmable gate array) based engine and the second guard data mover comprises a FPGA based engine.

24. The device of claim 19, wherein the data packet is intended for transmission to the second network when a header of the data packet specifies the second network as the destination of the data packet.

* * * * *